(12) United States Patent
Lin et al.

(10) Patent No.: US 8,705,947 B2
(45) Date of Patent: Apr. 22, 2014

(54) TRICK MODE ON BIDIRECTIONAL PREDICTIVE FRAMES

(75) Inventors: Shu Lin, Indianapolis, IN (US); Donald Henry Willis, Indianapolis, IN (US)

(73) Assignee: Thomson Licensing, Issy les Moulineaux (FR)

( * ) Notice: Subject to any disclaimer, the term of this patent is extended or adjusted under 35 U.S.C. 154(b) by 2376 days.

(21) Appl. No.: 10/099,710

(22) Filed: Mar. 14, 2002

(65) Prior Publication Data

US 2003/0077069 A1    Apr. 24, 2003

Related U.S. Application Data

(60) Provisional application No. 60/334,914, filed on Oct. 23, 2001.

(51) Int. Cl.
  *H04N 5/783* (2006.01)
(52) U.S. Cl.
  USPC .......................................... 386/343; 386/349
(58) Field of Classification Search
  USPC .......................... 386/343, 345, 347, 348, 349
  See application file for complete search history.

(56) References Cited

U.S. PATENT DOCUMENTS

| | | | |
|---|---|---|---|
| 5,649,047 A | 7/1997 | Takahashi et al. | |
| 5,841,939 A | 11/1998 | Takahashi et al. | |
| 5,978,855 A | 11/1999 | Metz et al. | |
| 6,009,229 A | 12/1999 | Kawamura | |
| 6,009,231 A | 12/1999 | Aoki et al. | |
| 6,014,494 A | 1/2000 | Minechika et al. | |
| 6,081,649 A | 6/2000 | Asamura et al. | |
| 6,192,186 B1 | 2/2001 | Murashima et al. | |
| 6,487,642 B1 * | 11/2002 | Duruoz et al. | 711/145 |
| 6,980,732 B1 | 12/2005 | Suzuki | |
| 7,072,571 B2 | 7/2006 | Suzuki | |
| 7,333,715 B2 | 2/2008 | Suzuki | |
| 7,424,203 B2 | 9/2008 | Suzuki | |

FOREIGN PATENT DOCUMENTS

| | | |
|---|---|---|
| JP | 11-146339 | 5/1999 |
| JP | 11-220694 | 8/1999 |
| JP | 2001028748 | 1/2001 |
| WO | 96/13121 | 5/1996 |
| WO | WO 9620566 | 7/1996 |
| WO | 9848573 A1 | 10/1998 |
| WO | WO 9965239 | 12/1999 |
| WO | 03036963 A1 | 5/2003 |

OTHER PUBLICATIONS

PCT Search Report.
Supplementary European Search Report for EP02784248 dated Feb. 22, 2010.

* cited by examiner

*Primary Examiner* — Robert Chevalier
(74) *Attorney, Agent, or Firm* — Robert D. Shedd; Kuniyuki Akiyama

(57) ABSTRACT

A method (200) and system (100) for performing a trick mode on a video signal. The method includes the steps of receiving (210) a trick mode command, in response to the trick mode command, repeating (212) a picture in the video signal to form a trick mode video signal in which the picture contains a display indicator; setting (214) the display indicator of the picture being repeated to a predetermined value; and setting (216) the display indicators of subsequent repeated pictures of the picture being repeated to the predetermined value. In one arrangement, the trick mode can be a freeze trick mode, and the picture to be repeated can be a bidirectional predictive picture. In addition, the display indicator can be a temporal reference field having an integer value.

20 Claims, 3 Drawing Sheets

TRICK MODE ON BIDIRECTIONAL PREDICTIVE FRAMES

CROSS REFERENCE TO RELATED APPLICATIONS (Not Applicable)

STATEMENT REGARDING FEDERALLY SPONSORED RESEARCH OR DEVELOPMENT (Not Applicable)

CROSS REFERENCE TO RELATED APPLICATIONS

This is a non-provisional application of provisional application Ser. No. 60/334,914 filed Oct. 23, 2001.

BACKGROUND OF THE INVENTION

1. Technical Field

The inventive arrangements relate generally to video systems and more particularly to video systems that record or play back digitally encoded video sequences.

2. Description of Related Art

Digital televisions (DTV) and high-definition televisions (HDTV) are gaining popularity in today's consumer electronics marketplace. Many purchasers of these types of televisions also buy digital video recorders or players, such as a digital video disc (DVD) recorder or player, for purposes of viewing previously recorded programs or recording their favorite programs. Notably, the combination of a DTV (or an HDTV) and a digital video recorder or player can be an integral part of a home theater entertainment system.

A digital video recorder or player typically contains an MPEG decoder to decode the digitally encoded multimedia data that is stored on the discs that the recorder or player plays. If the digital video recorder or player is connected to a conventional (non-DTV or non-HDTV) television, the digitally encoded signal will be decoded by the digital video recorder's or player's MPEG decoder before being displayed on the conventional television. Significantly, however, many DTV's contain their own MPEG decoders, as the MPEG decoder in the majority of digital video recorders or players cannot handle the decoding of video signals for such televisions. As such, if a digital video recorder or player is connected to a DTV, the video signal read from the disc is remotely decoded by the DTV's decoder. This configuration can be referred to as a remote decoder arrangement.

There is, however, an important disadvantage to decoding digitally encoded signals with a remote DTV decoder. Namely, certain trick mode commands, such as a freeze or pause command, can be problematic. When a freeze trick mode is initiated, there is no way to determine exactly how long the trick mode will remain in effect. Consequently, it is impossible to calculate how many times a particular picture will be displayed during this type of trick mode. This uncertainty can interfere with the display order of the pictures being transferred to the decoder in the DTV, as the DTV decoder is not under the control of the digital video recorder and has no way of knowing that a freeze trick mode has been initiated. Thus, a need exists for a method and system for performing a trick mode without negatively affecting the display order of the pictures in the video signal and without increasing system costs or complexity.

SUMMARY OF THE INVENTION

The present invention concerns a method of performing a trick mode on a video signal. The invention includes the steps of: receiving a trick mode command; in response to the trick mode command, repeating a picture in the video signal to form a trick mode video signal in which the picture contains a display indicator; setting the display indicator of the picture being repeated to a predetermined value; and setting the display indicators of subsequent repeated pictures of the picture being repeated to the predetermined value. In one arrangement, the trick mode can be a freeze trick mode, and the picture to be repeated can be a bidirectional predictive picture. In addition, the display indicator can be a temporal reference field having an integer value.

In one aspect of the invention, the method can further include the step transmitting at least a first reference picture and a second reference picture to predict the picture to be repeated in which each reference picture can contain a display indicator. In another aspect, the method can further include the steps of: setting the display indicator of the first reference picture to a predetermined value such that the predetermined value of the display indicator of the first reference picture can be lower than the predetermined value of the display indicators of the pictures being displayed during the trick mode; and setting the display indicator of the second reference picture to a predetermined value such that the predetermined value of the display indicator of the second reference picture can be greater than the predetermined value of the display indicators of the pictures being displayed during the trick mode.

In another arrangement, each of the display indicators can be temporal reference fields having integer values. Also, the step of setting the display indicator of the second reference picture can include the step of setting the integer value of the temporal reference field of the second reference picture an integer value higher than the integer value of the temporal reference field of the picture being repeatedly displayed during the trick mode to maintain a proper display order. Moreover, at least a portion of the trick mode video signal can be decoded by a remote decoder.

The invention also concerns a system for performing a trick mode on a video signal. The system includes: a controller for reading data from a storage medium and outputting the video signal; and a processor programmed to: receive a trick mode command; in response to the trick mode command, repeat a picture in the video signal to form a trick mode video signal in which the picture contains a display indicator; set the display indicator of the picture being repeated to a predetermined value; and set the display indicators of subsequent repeated pictures of the picture being repeated to the predetermined value. The system also includes suitable software and circuitry to implement the methods as described above.

DETAILED DESCRIPTION OF THE PREFERRED EMBODIMENTS

Figure 1:
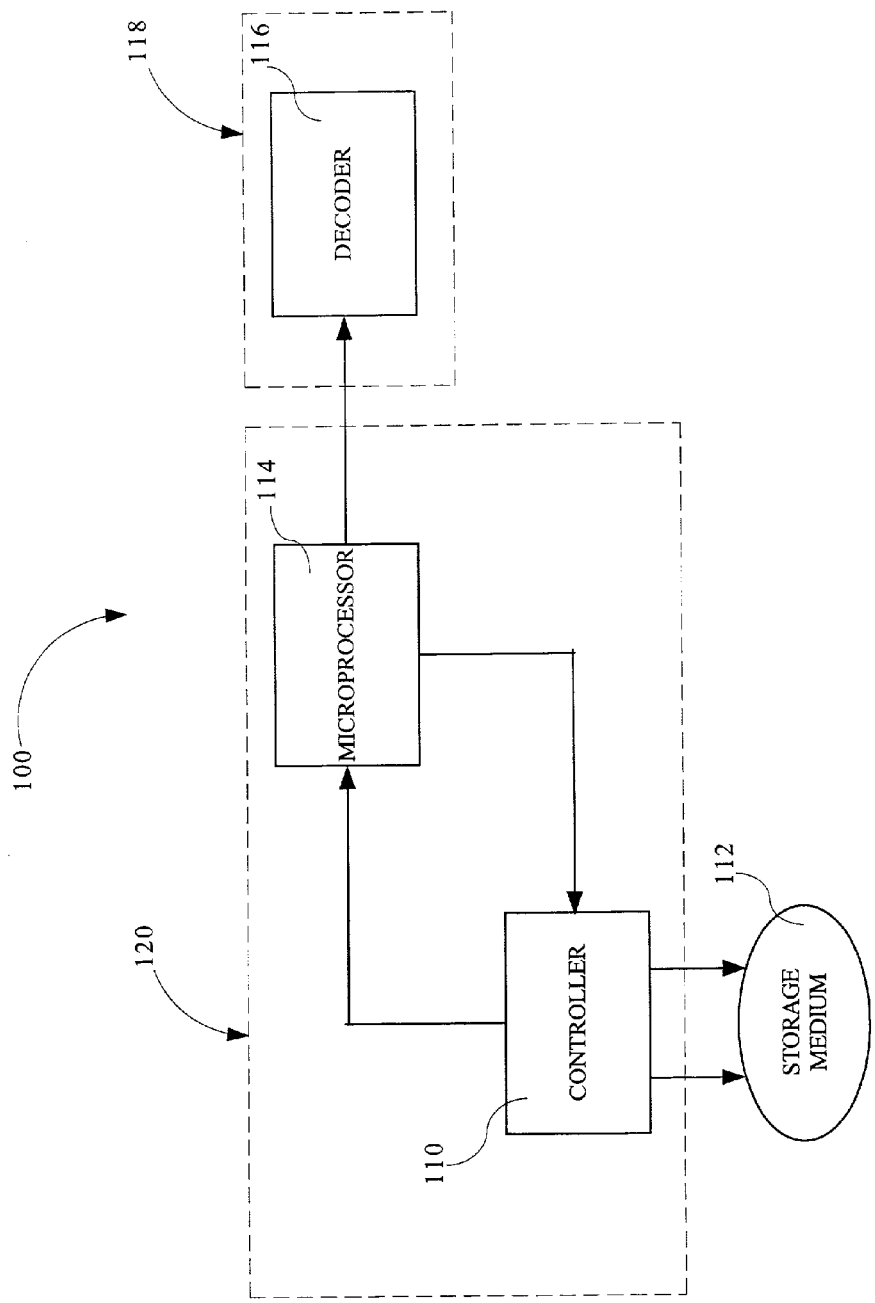
FIG. 1 is a block diagram of a system that can perform a trick mode on bidirectional predictive pictures in accordance with the inventive arrangements.

A system 100 for implementing the various advanced operating features in accordance with the inventive arrangements is shown in block diagram form in FIG. 1. The invention, however, is not limited to the particular system illustrated in FIG. 1, as the invention can be practiced with any other system capable of receiving a digitally encoded signal and transferring that signal to a display device. In addition, the system 100 is not limited to reading data from or writing data to any particular type of storage medium, as any storage medium capable of storing digitally encoded data can be used with the system 100.

The system 100 can include a controller 110 for reading data from and writing data to a storage medium 112. The system 100 can also have a microprocessor 114 and a display device 118. It should be understood that all or portions of the controller 110 and the microprocessor 114 can be a bitstream source 120 within contemplation of the present invention. Control and data interfaces can also be provided for permitting the microprocessor 114 to control the operation of the controller 110 and other components in the bitstream source 120. Suitable software or firmware can be provided in memory for the conventional operations performed by the microprocessor 114. Further, program routines can be provided for the microprocessor 114 in accordance with the inventive arrangements.

In one arrangement, the display device 118 can contain its own decoder 116 for decoding all or a portion of any video signal read from the storage medium 112 and processed by the bitstream source 120. In this particular arrangement, the decoder (not shown) in the bitstream source 120 typically does not decode the video signal read from the storage medium 112. This particular embodiment can be referred to as a remote decoder arrangement, and the decoder 116 in the display device 118 can be referred to as a remote decoder. It should be noted, however, that the invention is not limited to this arrangement, as the invention can be practiced with other suitable systems.

In operation, the controller 110 can read a video signal containing a plurality of digitally encoded pictures from the storage medium 112. In one arrangement, if the microprocessor 114 receives a trick mode command, then the microprocessor 114 can repeatedly transmit a picture in the video signal to the decoder 116 thereby forming a trick mode video signal. The microprocessor 114 can execute the repeating step by transmitting repeats or duplicates of the picture to be repeated. These duplicates of the picture to be repeated during the trick mode can be referred to as subsequent repeated pictures. In one aspect of the invention, the picture to be repeated can be a bidirectional predictive (B) picture, and the trick mode can be a freeze trick mode.

During the trick mode, the picture being repeated can be repeatedly displayed (through the use of the subsequent repeated pictures) at the display device 118. In addition, this picture and the subsequent repeated pictures can include a display indicator, which is typically used to enable the decoder 116 to determine when a picture is to be displayed, at least relative to other pictures in a video signal. In one arrangement, the microprocessor 114 can set the display indicator of the picture to be repeated and the subsequent repeated pictures to a predetermined value to reflect an intended display order. This predetermined value of the display indicator of the picture being repeated can be the same as the predetermined value of the display indicators of the subsequent repeated pictures. In addition, the microprocessor can set to a predetermined value the display indicators of any reference frames that may be used to predict the picture to be repeated during the trick mode. The overall operation of the invention will be discussed in greater detail below.

Performing Trick Mode on Bidirectional Predictive Frames

Figure 2:
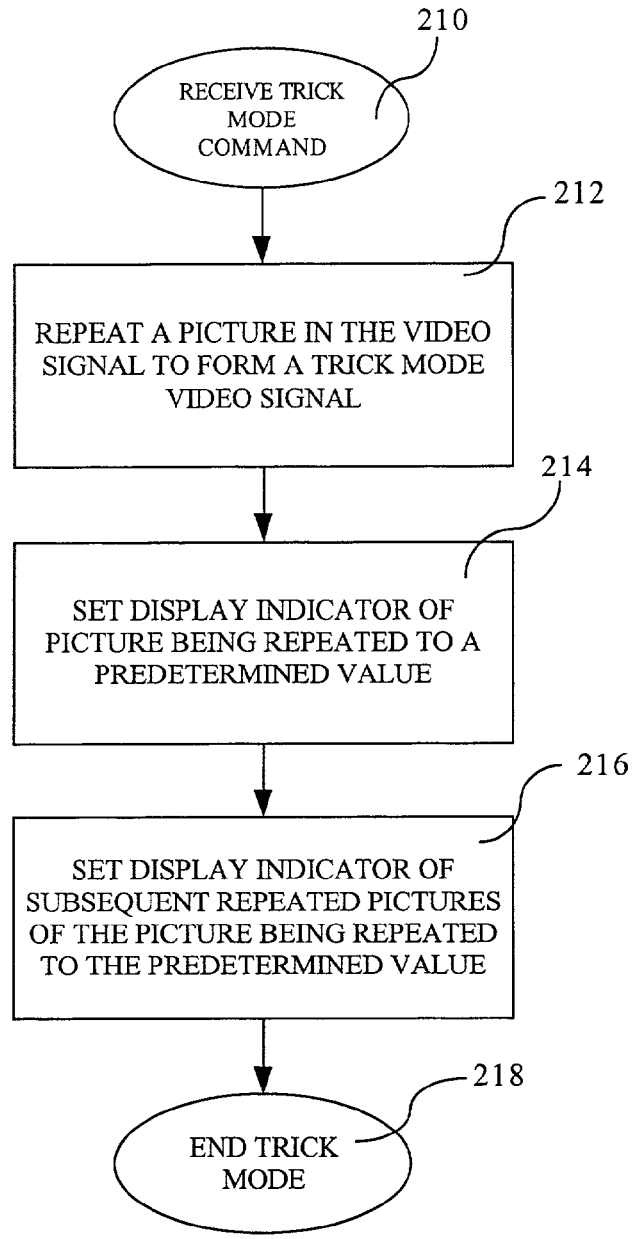
FIG. 2 is a flow chart that illustrates an operation of performing a trick mode on bidirectional predictive pictures in accordance with the inventive arrangements.

FIG. 2 illustrates a flowchart 200 that demonstrates one way in which a trick mode on B pictures can be executed. In one arrangement, the invention can be practiced in a remote decoder arrangement. For purposes of the invention, a remote decoder arrangement can be any system in which at least a portion of the pictures in a video signal can be decoded by a decoder that is external to and not under the control of a bitstream source that is providing the pictures to the decoder. As an example, the bitstream source can be an optical storage medium player or recorder, such as a digital video player or recorder that reads multimedia data from an optical storage medium and transfers this data over a transmission channel to a digital television, which contains its own decoder. It is understood, however, that the invention is not limited to this example or even a remote decoder arrangement, as the invention can be practiced in any other suitable system or arrangement.

At step 210, a trick mode command can be received. In one arrangement, the trick mode command can be a freeze or pause trick mode command. For purposes of the invention, a freeze trick mode can be a trick mode in which a particular picture in the video signal can be repeatedly displayed on a display device for an amount of time determined by a viewer. Although the invention is discussed primarily in terms of a freeze trick mode, it must be noted that the invention can be practiced with any other suitable trick mode. Once the trick mode command is received, at step 212, a picture in the video signal can be repeated to form a trick mode video signal.

In one arrangement and as noted earlier, the picture to be repeated can be a B picture, and the repeats or duplicates of this picture can be referred to as subsequent repeated pictures. In addition, the picture to be repeated and the subsequent repeated pictures can include a display indicator. It is understood, however, that the picture to be repeated is not limited to a B picture, as other suitable picture types can be used with the invention.

At step 214, the display indicator of the picture to be repeated can be set to a predetermined value. At step 216, the display indicators of subsequent repeated pictures of the picture being repeated can also be set to this predetermined value. As such, the value of the display indicator for each of the pictures to be displayed during the trick mode can be the same. The display indicator can be a temporal reference field. A temporal reference field is typically a ten bit field located in the picture header of digitally encoded pictures. This field normally has an integer value, and some decoders rely on this value to determine when a picture is to be displayed. The invention, however, is not limited in this regard, as other suitable display indicators can be used to reflect an intended display order.

Figure 3:
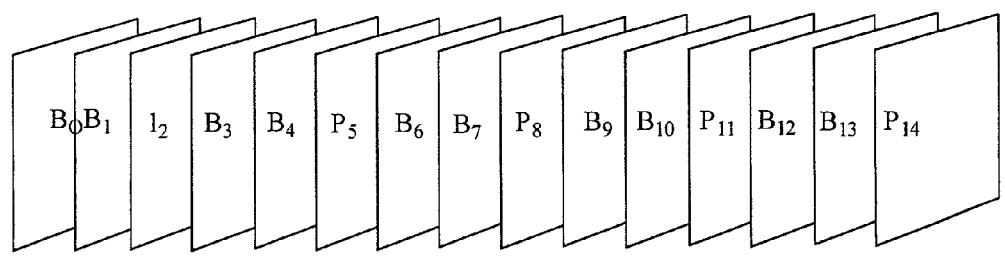
FIG. 3 shows a typical group of pictures structure in display order.

An example of the process described in steps 212-216 is discussed below. Referring to FIG. 3, a typical group of pictures (GOP) structure 300 in display order is shown. The GOP can include B pictures, predictive (P) pictures and intra (I) pictures. The subscript numbers represent integer values of each picture's temporal reference field and can indicate when a particular picture will be displayed relative to the other pictures in the GOP, at least during normal playback. For instance, the first picture in the GOP, $B_0$, will be displayed first followed by $B_1$, $I_2$ and so on. Those skilled in the art will appreciate that the invention is not limited to use on this particular type of GOP and that the integer values of the temporal reference fields are not limited to these particular values.

As is known in the art, when transmitting a B picture for decoding and display, the two reference pictures from which the B picture is predicted must be sent to the decoder and decoded before the B picture. Once the reference pictures are decoded, the B picture can be decoded, and the pictures are displayed according to their display order, which can be obtained from the integer values of the temporal reference fields. As an example, if the reference pictures are P pictures $P_5$ and $P_8$ and the B picture $B_6$ is to be decoded and displayed, then $P_5$ and $P_8$ are decoded first followed by $B_6$; however, the display order is as follows: $P_5$, $B_6$ and $P_8$ (for convenience, this example ignores picture $B_7$).

Continuing with this example, to reflect the intended display order, the integer value of the temporal reference field of picture $P_5$ can be set to a predetermined value of 5, the integer value of the temporal reference field of picture $B_6$ can be set to 6 and the integer value of the temporal reference field of picture $P_8$ can be set to 8. As the reference pictures are transmitted to the decoder and decoded prior to picture $B_6$, however, the value of the temporal reference fields of the reference pictures are set before the value of the temporal reference field of picture $B_6$.

Such a process can be problematic if a freeze trick mode is to be performed on picture $B_6$ (or any other B picture for that matter). Specifically, as picture $B_6$ is repeated, the value of the temporal reference fields of each of the subsequent repeated pictures is set to reflect their intended display order. Thus, the value of the temporal reference fields of subsequent repeated pictures of picture $B_6$ are typically incrementally increased during the freeze trick mode. As noted earlier, however, the integer value of the temporal reference field of reference picture $P_8$ will remain the same, and once the freeze trick mode is stopped, picture $P_8$ may be displayed out of order as the decoder, particularly if it is remotely located, is unaware that a trick mode has been initiated.

In accordance with the inventive arrangements, however, the integer value of picture $B_6$ can be set to 6, and the integer values of the temporal reference fields of subsequent repeated pictures of picture $B_6$ can also be set to a value of 6. Thus, referring back to flowchart 200, when the freeze trick mode is stopped at step 218, the second reference picture, $P_8$, can be displayed in its proper order. It must be noted that the foregoing discussion is merely one example of how the invention can be practiced and that other GOP structures and other pictures can be used with the invention.

Although the present invention has been described in conjunction with the embodiments disclosed herein, it should be understood that the foregoing description is intended to illustrate and not limit the scope of the invention as defined by the claims.

What is claimed is:

1. A method of performing a trick mode on a video signal, comprising the steps of:
   receiving a trick mode command;
   in response to the trick mode command, repeating a picture in the video signal to form a trick mode video signal, wherein the picture contains a display indicator;
   setting the display indicator of the picture being repeated to a predetermined value to reflect an intended display order of the picture being repeated in the trick mode video signal; and
   setting the display indicators of subsequent repeated pictures of the picture being repeated to the predetermined value.

2. The method according to claim 1, comprising the step of executing a freeze trick mode.

3. The method according to claim 1, comprising the step of repeating a bidirectional predictive picture.

4. The method according to claim 1, comprising the step of setting the display indicator as a temporal reference field having an integer value.

5. The method according to claim 1, further comprising the step of transmitting at least a first reference picture and a second reference picture to predict the picture to be repeated, wherein each reference picture contains a display indicator.

6. The method according to claim 5, further comprising the steps of:
   setting the display indicator of the first reference picture to a predetermined value such that the predetermined value of the display indicator of the first reference picture is lower than the predetermined value of the display indicator of the picture being repeatedly displayed during the trick mode; and
   setting the display indicator of the second reference picture to a predetermined value such that the predetermined value of the display indicator of the second reference picture is greater than the predetermined value of the display indicator of the picture being repeatedly displayed during the trick mode.

7. The method according to claim 6, comprising the step of setting each of the display indicators as temporal reference fields having integer values; and, wherein said step of setting the display indicator of the second reference picture further comprises the step of setting the integer value of the temporal reference field of the second reference picture an integer value higher than the integer value of the temporal reference field of the picture being repeatedly displayed during the trick mode to maintain a proper display order.

8. The method according to claim 1, further comprising the step of decoding at least a portion of the trick mode video signal at a remote location.

9. A method of performing a trick mode on a video signal, comprising the steps of:
   receiving a freeze trick mode command;
   in response to the freeze trick mode command, repeating a bidirectional predictive picture in the video signal to form a trick mode video signal, wherein the bidirectional predictive picture contains a display indicator;
   setting the display indicator of the bidirectional predictive picture being repeated to a predetermined value to reflect an intended display order of the picture being repeated in the trick mode video signal; and
   setting the display indicators of subsequent repeated bidirectional predictive pictures of the bidirectional predictive picture being repeated to the predetermined value.

10. The method according to claim 9, comprising the steps of implementing the receiving, repeating and both setting steps at a first location and decoding at least a portion of the trick mode video signal at a second location.

11. A system for performing a trick mode on a video signal, comprising:
   a controller for reading data from a storage medium and outputting the video signal; and
   a processor programmed to:
      receive a trick mode command;
      in response to the trick mode command, repeat a picture in the video signal to form a trick mode video signal, wherein the picture contains a display indicator;
      set the display indicator of the picture being repeated to a predetermined value to reflect an intended display order of the picture being repeated in the trick mode video signal; and
      set the display indicators of subsequent repeated pictures of the picture being repeated to the predetermined value.

12. The system according to claim 11, wherein the trick mode is a freeze trick mode.

13. The system according to claim 11, wherein the picture to be repeated is a bidirectional predictive picture.

14. The system according to claim 11, wherein the display indicator is a temporal reference field having an integer value.

15. The system according to claim 11, wherein the processor is further programmed to transmit at least a first reference picture and a second reference picture to predict the picture to be repeated, wherein each reference picture contains a display indicator.

16. The system according to claim 15, wherein the processor is further programmed to:
   set the display indicator of the first reference picture to a predetermined value such that the predetermined value of the display indicator of the first reference picture is lower than the predetermined value of the display indicator of the picture being repeatedly displayed during the trick mode; and
   set the display indicator of the second reference picture to a predetermined value such that the predetermined value of the display indicator of the second reference picture is greater than the predetermined value of the display indicator of the picture being repeatedly displayed during the trick mode.

17. The system according to claim 16, wherein each of the display indicators are temporal reference fields having integer values and the processor is further programmed to perform the step of setting the display indicator of the second reference picture by setting the integer value of the temporal reference field of the second reference picture an integer value higher than the integer value of the temporal reference field of the picture being repeatedly displayed during the trick mode to maintain a proper display order.

18. The system according to claim 11, wherein at least a portion of the trick mode video signal is decoded by a remote decoder.

19. A system for performing a trick mode on a video signal, comprising:
   a controller for reading data from a storage medium and outputting the video signal; and
   a processor programmed to:
      receive a freeze trick mode command;
      in response to the freeze trick mode command, repeat a bidirectional predictive picture in the video signal to form a trick mode video signal,
   wherein the picture contains a display indicator;
      set the display indicator of the bidirectional predictive picture being repeated to a predetermined value to reflect an intended display order of the picture being repeated in the trick mode video signal; and
      set the display indicators of subsequent repeated bidirectional predictive pictures of the bidirectional predictive picture being repeated to the predetermined value.

20. The system according to claim 19, further comprising a remote decoder for decoding at least a portion of the trick mode video signal.

* * * * *